United States Patent [19]
Colavito et al.

[11] Patent Number: 5,884,851
[45] Date of Patent: *Mar. 23, 1999

[54] ABRASION RESISTANT LINED SWEEP NOZZLE

[75] Inventors: Dominick Colavito, Bangor, Pa.; William Peschler, Sayerville, N.J.; Douglas Vanderbilt, Orland Park, Ill.

[73] Assignee: Minerals Technologies Inc., New York, N.Y.

[ * ] Notice: The term of this patent shall not extend beyond the expiration date of Pat. No. 5,634,598.

[21] Appl. No.: 826,850

[22] Filed: Apr. 10, 1997

Related U.S. Application Data

[63] Continuation-in-part of Ser. No. 309,308, Sep. 20, 1994, Pat. No. 5,634,598.

[51] Int. Cl.$^6$ .................................................. B05B 1/00
[52] U.S. Cl. .................................. 239/591; 138/DIG. 6
[58] Field of Search ......................... 239/591, 654; 138/DIG. 8, DIG. 11, DIG. 6, 120, 155, 118; 451/90, 102

[56] References Cited

U.S. PATENT DOCUMENTS

| | | | |
|---|---|---|---|
| 937,940 | 10/1909 | Jones . | |
| 1,081,950 | 12/1913 | Eller . | |
| 1,958,085 | 5/1934 | Hammon | 158/27.4 |
| 2,297,239 | 9/1942 | Neugebaur et al. | 60/35 |
| 2,342,052 | 2/1944 | Morris | 138/155 |
| 2,428,278 | 9/1947 | Griswold | 451/102 |
| 3,381,857 | 5/1968 | Scott | 239/424 |
| 3,698,646 | 10/1972 | Robba et al. | 239/591 |
| 3,722,821 | 3/1973 | Jaeger et al. | 239/133 |
| 3,900,675 | 8/1975 | Olott | 428/367 |
| 4,168,033 | 9/1979 | von Bernuth et al. | 239/523 |
| 4,419,971 | 12/1983 | Nakamura et al. | 123/193 C |
| 4,473,171 | 9/1984 | Nunlist | 220/465 |
| 4,528,782 | 7/1985 | Bean | 51/439 |
| 4,684,155 | 8/1987 | Davis | 285/16 |
| 4,770,346 | 9/1988 | Kacynski | 239/73 |
| 4,779,586 | 10/1988 | White, Jr. | 123/198 E |
| 4,834,297 | 5/1989 | Cumming et al. | 428/690 |
| 4,877,705 | 10/1989 | Polidor | 428/34.6 |
| 4,950,627 | 8/1990 | Tokarz et al. | 501/95 |
| 4,976,288 | 12/1990 | Steele et al. | 158/120 |
| 5,137,789 | 8/1992 | Kaushal | 428/472 |
| 5,199,649 | 4/1993 | Tolboll | 239/600 |
| 5,200,241 | 4/1993 | Nied et al. | 428/34 |
| 5,211,999 | 5/1993 | Okada | 428/34.5 |
| 5,634,598 | 6/1997 | Colavito et al. | 239/591 |

FOREIGN PATENT DOCUMENTS

| | | | |
|---|---|---|---|
| 123433 | 8/1900 | Germany | 138/155 |
| 665173 | 5/1979 | Sweden | 138/DIG. 8 |
| 2176865 | 1/1987 | United Kingdom | 138/155 |

*Primary Examiner*—Kevin Weldon
*Attorney, Agent, or Firm*—Pennie & Edmonds LLP

[57] ABSTRACT

This invention relates to a nozzle and a nozzle mix gunning system incorporating the nozzle for pneumatically propelling dry or wetted particulate gunning material toward a substrate a distance removed from the nozzle and at an angle to the line of sight of the operator. The nozzle comprises a plurality of substantially straight tubular sections. Each section is lined with an abrasion resistant material, and joined to the other sections in a manner that produces a curvature in the nozzle. The cross-section of the jacket sections and the bore of the abrasion resistant liner may be independently circular or polygonal, where a jacket or liner having a polygonal cross-section has at least three substantially flat sides.

23 Claims, 2 Drawing Sheets

ABRASION RESISTANT LINED SWEEP NOZZLE

REFERENCE TO RELATED APPLICATION

This application is a continuation-in-part of application Ser. No. 08/309,308, filed Sep. 20, 1994, now U.S. Pat. No. 5,634,598.

TECHNICAL FIELD

This invention relates to a method and apparatus for pneumatically propelling a granular material at or onto a substrate. More particularly, the invention relates to a nozzle for directing dry or wetted particulate gunning material, suspended in air or in a liquid stream, toward a substrate a distance removed from the nozzle.

BACKGROUND OF THE INVENTION

Nozzle mix gunning operations employ an apparatus for pneumatically propelling dry or wetted granular material through a hose and nozzle combination at or onto a substrate located a distance from the nozzle. Common gunning materials include, for example, refractory and insulating products, which are applied so as to at least partially coat the surface of a substrate. Alternatively, sand or other abrasives may be gunned against the outer surface of a substrate to clean or otherwise condition the substrate.

Typically, the granular material to be gunned is ground to a desired particulate size and deposited within a sealed tank or hopper (known as a gun) where the particulates are mixed with a gas, such as air, at elevated pressure. The particulate/air mixture is thereafter released from the gun through a valve, whereupon the mixture passes through a hose and out the nozzle of the gunning apparatus, which is used to direct the mixture at the surface of the substrate.

Nozzle mix gunning operations are most effective when the granular material is gunned directly at the surface of the substrate, that is, at a 90° angle or perpendicular to the surface. Gunning at an angle other than 90° results in excessive rebound; that is, material that should stick to the substrate surface, which instead bounces off the surface. Excessive rebound results in the waste of a significant portion of the granulated material, which is not only costly, but also raises cleanup, contamination, and disposal problems.

With a straight nozzle, the mix can only be gunned at a 90° angle to the surface when the surface is directly in front of the operator. If the surface to be gunned is inside an enclosed volume, such as a furnace, or if the operator must reach any appreciable distance across a substrate surface with a straight nozzle, it becomes impossible to gun the material at a 90° angle to the surface, and increased rebound results.

Traditionally, a smoothly curved nozzle or haphazard arrangement of pipe fittings has been used to insure that the material is gunned at the proper angle. A curved nozzle allows an operator to apply a refractory coating to the entire inner surface of an enclosed space, without the need to enter the enclosure as would be required with a straight nozzle. However, pipe fittings and smoothly curved nozzles have two important shortcomings: (1) use of these nozzles results in an increase in divergence and material separation in the stream of gunned material, allowing a significant amount of material to impact the surface at an angle other than 90°, which increases rebound and pipe drip, and (2) a steel sweep will only last 5 to 30 minutes in pneumatic gunning, depending on the grade and thickness of the steel, because the impact of the abrasive gunned material wears away the interior surface of the nozzle.

Therefore, there is a need in the art for an improved device capable of overcoming the problems encountered with the prior art devices described above.

SUMMARY OF THE INVENTION

The present invention provides a novel and advantageous means for directing a flow of particulate material with a gunning apparatus at a substrate surface at an angle of substantially 90°, minimizing the divergence and rebound and optimizing the properties of the stream of gunned material so that these properties are similar to those produced by a straight nozzle, while maximizing the life expectancy of the nozzle.

In a first embodiment, the invention relates to a nozzle comprising a plurality of jacket sections and means for joining the jacket sections together. Each jacket section has a cylindrical or polygonal inner surface, an inner liner of an abrasion resistant material for protecting the inner surface against abrasion, and at least one end portion which is angled to produce an angle of curvature in the nozzle of between about 25° and 90°. The abrasion resistant inner liner has an outer surface, having a shape that corresponds and conforms to the inner surface of the jacket section, and an inner surface, defining a cylindrical or polygonal internal bore that is substantially straight in each section.

Preferably, at least three jacket sections are joined to produce an angle of curvature in the nozzle of between about 45° and 90°. Advantageously, at least four jacket sections are joined to produce an angle of curvature in the nozzle of between about 55° and 85°.

The preferred abrasion resistant liner in each jacket section may be a single substantially tubular liner component, or a plurality of abrasion resistant tiles which are interconnected to form a substantially tubular abrasion resistant liner component. Where the internal bore formed by the liner is polygonal, the bore typically has three or more, preferably four to six, substantially flat sides. Each side of the polygon may be formed from a single abrasion resistant tile. Most preferably, a polygonal internal bore has a cross-section in the form of a square or hexagon.

The cross-section of the bore of the abrasion resistant liner need not correspond to that of the jacket, and a liners having circular or polygonal cross-sections may be used with either a cylindrical or polygonal jacket. Preferably, however, the cross-section of the internal bore corresponds to that of the jacket.

For high temperature applications, the abrasion resistant liner is formed from a ceramic material, such as alumina, silicon carbide or zirconia toughened alumina. However, in applications where the nozzle is not exposed to high temperatures, the abrasion resistant liner may be formed from an elastomer or plastic material. Various combinations of bore cross-section and materials are possible. For example, the internal bore of the abrasion resistant liner formed from a ceramic material may have a polygonal cross-section, or an internal bore having a circular cross-section may be formed from an elastomer or plastic material. In addition, at least one of the jacket sections in the nozzle typically includes means for connection to a fluid directing component.

The invention also relates to a nozzle mix gunning system comprising means for entraining a particulate material within a fluid stream, nozzle means for directing the entrained material against a surface, and means for directing the entrained material to the nozzle, where the nozzle is of the type described above. The fluid stream may be air or water so that the entrained material can be applied dry or wet. Also, the nozzle means generally includes means for connection to the entrained material directing means, such as a threaded portion on the exterior surface of one of the tubular sections.

DETAILED DESCRIPTION OF THE EMBODIMENTS

Figure 1:
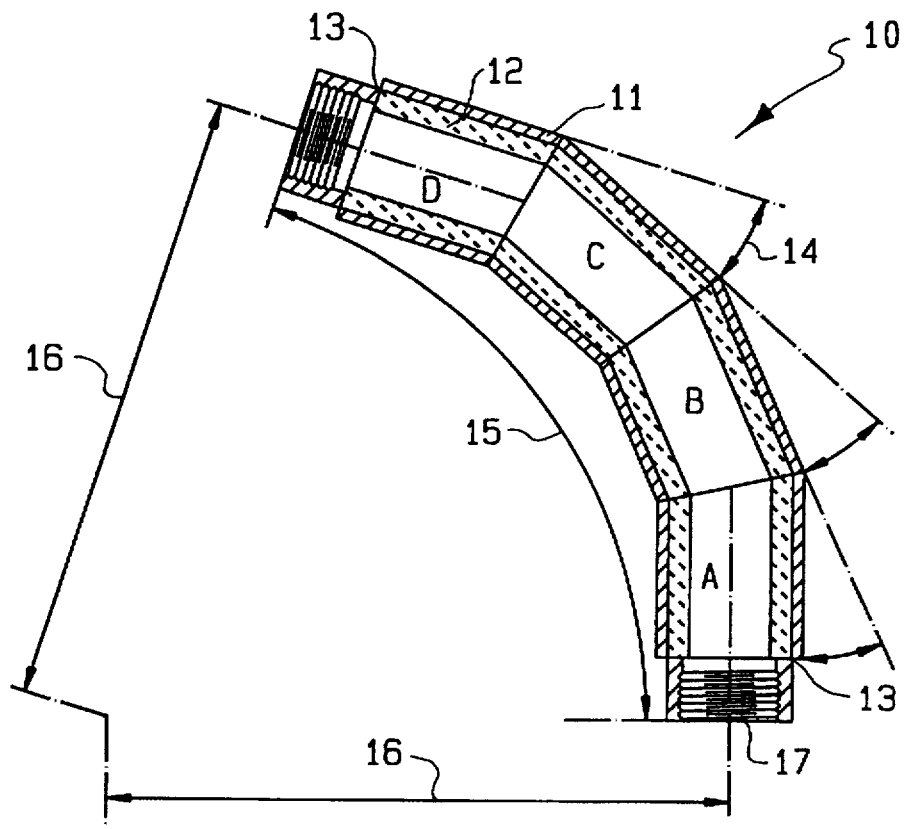
FIG. 1 is a schematic of the preferred embodiment of a ceramic material lined sweep nozzle.

FIG. 1 illustrates an abrasion resistant material lined sweep nozzle according to the present invention. One typical use for this device is with a nozzle mix gunning apparatus used for replacing the refractory lining on metallurgical furnaces, such as those used in the production of steel. To limit the duration of furnace "down time," refinishing operations are frequently carried out while the furnace is at an elevated temperature. Therefore, the operator must remain outside the furnace during the refinishing operation, and the nozzle of the gunning apparatus must be designed to ensure that the stream of gunning material is applied at as close as possible to a 90° angle to all of the interior surfaces of the furnace so that the surfaces are coated with a minimum of rebound and drip, and the adherence, durability, and other properties of the gunned material are optimized. Otherwise, furnace down time will be increased because of the need to clean out the waste material provided from the rebound.

In the foregoing example, the nozzle of the present invention is subjected to elevated temperatures, which require an abrasion resistant liner of a temperature resistant material, such as a ceramic or high temperature composite. Alternatively, in situations where high temperature conditions do not occur, such as in the room-temperature application of the gunning material, resistance to high temperature is not required, and other materials can be used, including rubber, other elastomers, or plastics. In particular, gum rubber has been shown to be a useful material because its resilience allows the gunning material to bounce off without causing appreciable deterioration or wear to the rubber lining. When elastomers or plastics are used as the lining material, the pipe sections should be connected using a joining procedure which does not deteriorate the lining. In addition, the entire nozzle can be made of an elastomeric or plastic material. One of ordinary skill in the art is aware of the various lining or fabrication procedures for elastomer and plastic materials, so that no further explanation is necessary herein.

To achieve the desired change of direction of the sprayed or gunned material, a curved or angled nozzle is required. If the nozzle is curved or angled properly, the operator can orient the nozzle so that the gunning stream is substantially at a 90° angle to any interior surface of an enclosed space that requires coating. In addition, the interior of the nozzle must be sufficiently hard to resist the impact and abrasion of the gunned material, or it may wear out in as little as five minutes of use, because of the impact of the abrasive gunned material on the inner surface of the nozzle.

As shown in FIG. 1, the nozzle 10 of the present invention is constructed from multiple sections A, B, C, and D of abrasion resistant lined pipe. The outer jacket 11 of each section is preferably constructed of metal pipe, such as steel or other suitable material, which is capable of withstanding the elevated temperature and the internal nozzle pressure commonly encountered in the gunning process and maintaining the integrity of the liner. The pipe may have a circular internal cross-section, or, alternatively, the internal cross-section may be polygonal. That is the internal bore of the pipe may be circular or multi-sided, having three or more, preferably four to six, substantially flat sides. Most preferably, the cross-section of the internal bore of the pipe is either square or a regular hexagon.

Each section of pipe 11 is initially prepared in the desired angular size and length. To resist the abrasive materials which are to be gunned, each section is provided with an abrasion resistant liner 12. According to the most preferred embodiment of the invention, the abrasive resistant liner is made of a ceramic material such as alumina, silicon carbide, zirconia toughened alumina, or other ceramic having similar hardness characteristics, for high temperature use, or an elastomer or plastic material, for low temperature use. These materials can resist the impact and abrasion of the gunning material during extended gunning periods.

As with the outer jacket 11, the abrasion resistant liner 12 may have either a circular or a polygonal internal cross-section, which defines the bore of each section. That is the internal bore of the abrasion resistant liner may be circular or multi-sided, having three or more, preferably four to six, substantially flat sides. Most preferably, the cross-section of the internal bore of the liner 12 is either a square or regular hexagon. The external cross-section of the abrasion resistant liner 12 should correspond to the internal cross-section of the jacket 11. In the most preferred embodiment, a ceramic liner 12 with a thickness of between about 5/16 inch and about 1/2 inch and an internal diameter or width of about 1 to 3 inches, preferably about 2 inches, is used. Other sizes can be used for these components depending upon the specific application.

When the internal cross-section of the jacket is circular, it is preferred to use a cylindrical ceramic or plastic liner, or to apply an elastomeric lining to the internal bore of the jacket. Also, an internal cylindrical pipe that contains an elastomeric or plastic lining thereon can be inserted into the jacket. Alternatively, when the internal bore of the jacket has a polygonal cross-section, the use of interlocking ceramic tiles is preferred for the abrasion resistant material. However, elastomeric or plastic tiles may also be used.

In the preferred embodiment, the bore defined by the abrasion resistant liner in each section is substantially straight, without any significant degree of curvature along its length. This avoids divergence of the stream of gunned material which will increase the amount of rebound because a significant part of the stream will impact the surface at an angle other than 90°. The nozzle of the present invention produces a tightly packed, homogenous mass of gunning material on the target surface, which reduces the amount of rebound and pipe drip that is found with the divergent stream produced by a nozzle made from smoothly curved pipe or pipe fittings.

In addition, it is convenient to construct the nozzle from sections which when connected have a symmetry about a central axis to minimize the number of different sections that need to be prepared. For the preferred embodiment shown in FIG. 1, only two differently configured sections are required: sections A and D are the same, and sections B and C are the same. Even when shorter length sections are utilized, the ends can be of the same sized components, with a predetermined number of identical intermediate components used, so that only two differently configured components (i.e., the end and the intermediate sections) are required.

In the most preferred embodiment, the ceramic liner 12 of each section may be a single component of a tubular ceramic having outer dimensions that allow the liner 12 to fit snugly within the outer jacket 11 with a minimum of space between the outer jacket 11 and the ceramic liner 12. In the alternative, the ceramic liner 12 may be constructed from a plurality of ceramic tiles which are configured to fit together to form the ceramic liner 12, and are keyed so that the shape of the liner 12 is maintained and does not collapse in on itself, even without the use of glue or other adhesives during installation of the tiles in the outer jackets 11. For liners having polygonal bores, each side of the polygon may be formed from a single tile that interlocks with the tiles that form the adjacent sides. Even where there are slight spaces between the tiles after installation, these spaces are rapidly filled with the material to be gunned so that fluid flow or turbulence difficulties are avoided during operation of the nozzle.

When installing the tiles or liner into the outer jackets, it is convenient to begin with the end of the nozzle (i.e., section A) that has a threads for coupling the nozzle to the hose that carries the material to be gunned. The interior bore of the outer jacket of section A is reduced to which provide a shoulder 13 that acts as a stop for the forward positioning of the ceramic insert or tiles. Thereafter, the next section of outer jacket (i.e., B) can be welded to section A, and provided with its ceramic liner or tiles. The liner of section A will act as a stop for the insertion of the liner in section B. This procedure is continued for sections C, D, etc., until the entire nozzle is constructed. If desired, the final section can include threads for connection to another hose of conduit for directing the gunning material to the surface. When a section such as D is used, the interior shoulder 13 will help retain the liner in position in the outer jacket.

To retain the liner 12 in the outer jackets 11, the liner can be configured as a tube having a slightly widened portion or greater diameter on its rear end relative to its front end diameter. This enables the liner to be placed into the outer jacket and then be retained in position by the widened structure. Such structure also prevents forward movement of the liner through the outer jacket.

It is also possible to purchase ready-made ceramic lined pipe sections from a variety of sources. One particularly preferred lined pipe material is silicon carbide. Silicon carbide lined pipe is available commercially from a variety of sources known to those of ordinary skill in the art.

Before any of the abrasion resistant lined pipe sections can be joined, the ends of the each section should be mitered or otherwise configured to produce the desired curvature of the nozzle. Thus, when the sections are joined by an appropriate means, such as a butt weld, the appropriate change of direction of the material to be sprayed by the nozzle is achieved. By varying the miter angle 14 and the number of sections, any desired angle of curvature 15 for the nozzle can be obtained.

In the present invention, the angle of curvature 15 of the nozzle may range from about 25° to substantially 90°. Nozzle angles of about 25° to 55° can be used for a slight curvature of the direction of the gunning material, while greater angles of up to about 85° can be used for surfaces which are more difficult to access. An angle of substantially 90° is used for the greatest change of direction of the stream.

In the most preferred embodiment, four sections 10 of lined mitered pipe are used with a miter angle 14 of about 23.33° for each joint, to provide the nozzle with a total angle of curvature of approximately 70°.

The radius of center line curvature 16 for the preferred embodiment can range from about 6 inches to about 16 inches, with a most preferred radius of center line curvature of 10 inches. This results in a nozzle of about 16 inches to about 18 inches in length, including the pipe couplings 17, which are attached by an appropriate means to each end of the nozzle.

Figure 2:
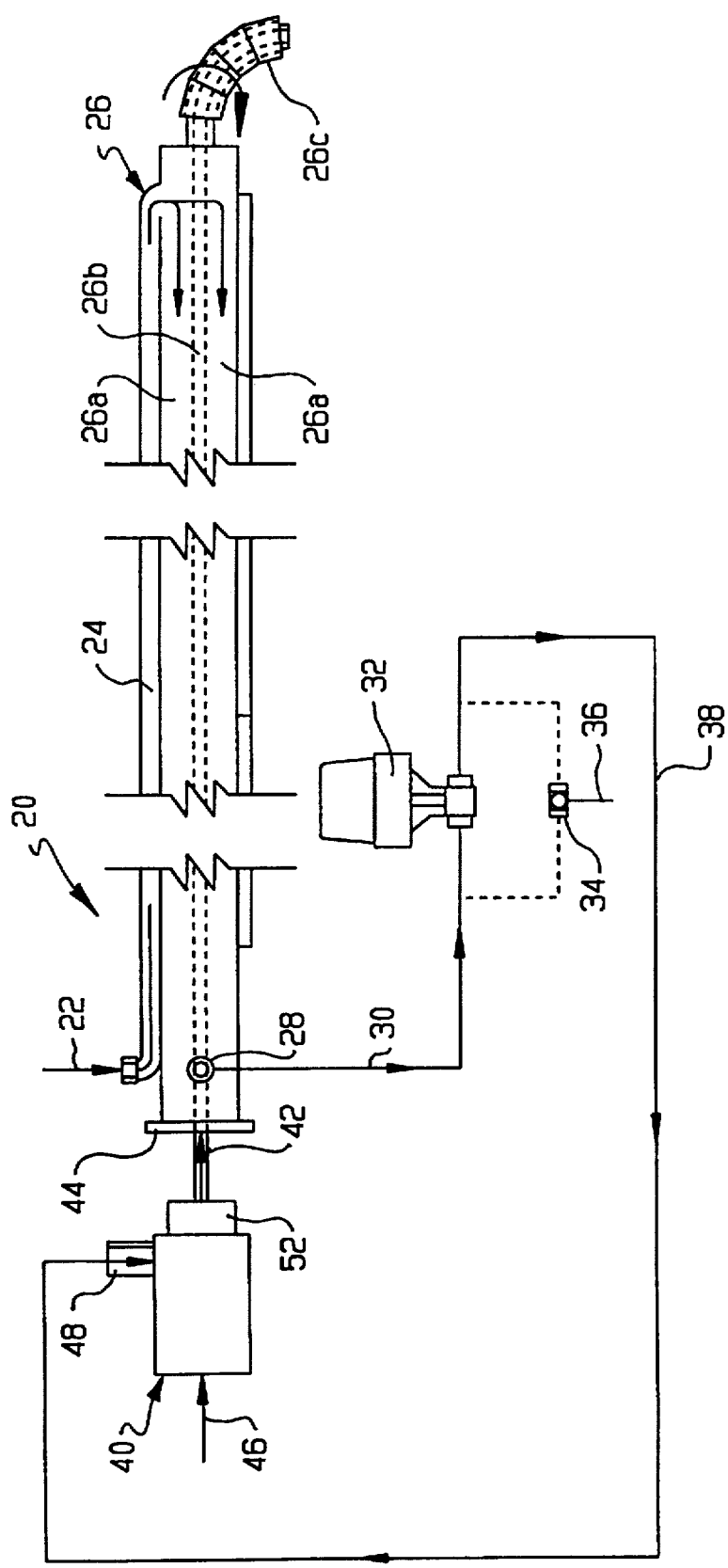
FIG. 2 is a schematic view of the preferred embodiment of nozzle mix gunning system.

FIG. 2 is a schematic representation of the preferred embodiment of gunning apparatus 20. As shown, liquid coolant, i.e., a fluid, such as water, enters from line 22 into conduit 24. Conduit 24 empties into shooter boom (hereinafter "boom") 26. Boom 26 is typically mounted upon a pivotable support (not shown) to permit vertical and horizontal movement for facilitating delivery of the gunned material to all areas of the substrate to which the material is to be applied.

Boom 26 comprises an elongated tubular outer shell portion 26a through which the water circulates, an elongated pipe member 26b (shown in phantom), mounted coaxially within shell 26a, and nozzle 26c, of the type described above, and illustrated in FIG. 1. Pipe member 26b is adapted for directing a stream of pneumatically propelled granular material, entrained in a fluid stream, to nozzle 26c, from where the entrained material is directed to a substrate located at a distance from the boom. Pipe member 26b is adapted to permit reciprocal back and forth motion within the boom, i.e., it can be extended and/or retracted, and can also be rotated in a clockwise and/or counterclockwise direction to change the orientation of nozzle 26c. Thus, by changing any of the angular orientation of the boom 26 upon its support, the position of delivery pipe 26b, or the orientation of nozzle 26c, the nozzle 26c at the end of pipe 26b may be directed toward the substrate at substantially any desired angle.

After circulating through boom outer shell 26a, the water exits through port 28 in the outer wall of the shell and passes through line 30 into actuator valve 32. Valve 32 is of a type well known in the art for controlling water flow, and, thus, its operation need not be described. If desired, an optional by-pass 34 can be provided to divert excess water through line 36 in the event valve 32 becomes over-pressurized.

After passing through valve 32, the water travels through line 38 to water ring body 40, which may either be connected to pipe 26b within boom 26 by a hose 42, or may be positioned in abutting contact with the inlet end of boom 26 with its exit in alignment with pipe 26b, whereupon a connection may be made to flange 44 on boom 26 by fastening means such as bolts, screws or other coupling devices well known in the art.

A flow of particulate gunning material suspended in a gas, e.g., air, enters water ring body 40 through line 46, e.g., a hose connected to the gun (not shown). In water ring body 40, water enters the body 40 through tubular member 48, and is mixed with the particulate solids, entraining the particulate solids in a fluid stream. The entrainment occurs as water entering ring body 40 passes through a plurality of internal apertures (not shown) spaced around the internal periphery of the water ring 52 toward the flow of air-entrained particulates 46 passing substantially perpendicularly through body 40. The apertures are commonly oriented at an angle away from the source of particulates to prevent them from becoming blocked with the particulate material, permitting a greater amount of the liquid to mix with the solid material.

After mixing with the water entering through the apertures in ring 52, the entrained particulate material exits the water ring body 40 and is directed to pipe 26b, whereupon it is directed to the nozzle 26c, and pneumatically ejected toward the substrate.

The invention described and illustrated herein is capable of a variety of modifications within the ability of persons of ordinary skill in the art. For example, if desired, the liner can be configured with a flange or similar component which will assist in the proper positioning of the liner within the outer jacket. All such modifications are considered to be within the spirit and scope of the appended claims.

What is claimed is:

1. A nozzle comprising a plurality of jacket sections and means for joining the jacket sections together; each jacket section having a cylindrical or polygonal inner surface, an inner liner of an abrasion resistant material for protecting the inner surface against abrasion, and at least one end portion which is angled to produce an angle of curvature in the nozzle of between about 25° and 90°; the abrasion resistant inner liner having an outer surface having a shape that corresponds and conforms to the inner surface of the jacket section and an inner surface defining a cylindrical or polygonal internal bore that is substantially straight in each section.

2. The nozzle of claim 1, wherein the abrasion resistant liner in each jacket section is a single substantially tubular liner component.

3. The nozzle of claim 1, wherein the abrasion resistant liner in each jacket section comprises a plurality of abrasion resistant tiles which are interconnected to form a substantially tubular abrasion resistant liner component.

4. The nozzle of claim 1, wherein the abrasion resistant liner has a polygonal cross-section, and each side of the polygon is formed from a single abrasion resistant tile.

5. The nozzle of claim 1, wherein at least three jacket sections are joined to produce an angle of curvature in the nozzle of between about 45° and 90°.

6. The nozzle of claim 1, wherein at least four jacket sections are joined to produce an angle of curvature in the nozzle of between about 55° and 85°.

7. The nozzle of claim 1, wherein of the internal bore of the abrasion resistant liner has a cross-section in the form of a square or hexagon.

8. The nozzle of claim 1, wherein at least one of the jacket sections includes means for connection to a fluid directing component.

9. The nozzle of claim 1, wherein the internal bore of the abrasion resistant liner has a polygonal cross-section, and the abrasion resistant material is a ceramic material.

10. The nozzle of claim 9, wherein the ceramic material comprises alumina, silicon carbide or zirconia toughened alumina.

11. The nozzle of claim 1, wherein the internal bore of the abrasion resistant liner has a circular cross-section, and the abrasion resistant material is an elastomer or plastic material.

12. The nozzle of claim 1, wherein the internal bore of the abrasion resistant liner has a cross-section that corresponds to that of the inner surface of the jacket.

13. The nozzle of claim 1, wherein the inner surface of the jacket section is cylindrical, and the internal bore of the abrasion resistant liner has a circular cross-section.

14. A nozzle mix gunning system comprising means for entraining a particulate material within a fluid stream, nozzle means for directing the entrained material against a surface, and means for directing the entrained material to the nozzle; wherein the nozzle means comprises a plurality of jacket sections and means for joining the jacket sections together, each jacket section having a cylindrical or polygonal inner surface, an inner liner of an abrasion resistant material for protecting the inner surface against abrasion, and at least one end portion which is angled to produce an angle of curvature in the nozzle of between about 25° and 90°, the abrasion resistant inner liner having an outer surface having a shape that corresponds and conforms to the inner surface of the jacket section and an inner surface defining a cylindrical or polygonal internal bore that is substantially straight in each section.

15. The nozzle mix gunning system of claim 14, wherein the fluid stream comprises water so that the entrained material is wet.

16. The nozzle mix gunning system of claim 14, wherein the nozzle means includes means for connection to the entrained material directing means.

17. The nozzle mix gunning system of claim 16, wherein the means for connection comprises a threaded portion on the exterior surface of one of the tubular sections.

18. The nozzle mix gunning system of claim 14, wherein in each jacket section the abrasion resistant liner is a single substantially tubular liner component.

19. The nozzle mix gunning system of claim 14, wherein in each jacket section the abrasion resistant liner comprises a plurality of abrasion resistant tiles which are interconnected to form a substantially tubular abrasion resistant liner component.

20. The nozzle mix gunning system of claim 14, wherein at least three jacket sections are joined to produce an angle of curvature in the nozzle of between about 45° and 90°.

21. The nozzle mix gunning system of claim 14, wherein the internal bore has a polygonal cross-section, and the abrasion resistant material is a ceramic material.

22. The nozzle mix gunning system of claim 14, wherein the internal bore has a circular cross-section, and the abrasion resistant material is an elastomer or plastic material.

23. The nozzle mix gunning system of claim 14, wherein the fluid stream comprises air so that the entrained material is dry.

* * * * *